United States Patent
Georges et al.

(10) Patent No.: US 10,770,094 B2
(45) Date of Patent: Sep. 8, 2020

(54) ROUTING AUDIO STREAMS BASED ON SEMANTICALLY GENERATED RESULT SETS

(71) Applicant: INTEL IP CORPORATION, Santa Clara, CA (US)

(72) Inventors: Munir Nikolai Alexander Georges, Kehl (DE); Jakub Nowicki, Brianiewo (PL)

(73) Assignee: Intel IP Corporation, Santa Clara, CA (US)

( * ) Notice: Subject to any disclaimer, the term of this patent is extended or adjusted under 35 U.S.C. 154(b) by 163 days.

(21) Appl. No.: 15/865,428

(22) Filed: Jan. 9, 2018

(65) Prior Publication Data
US 2019/0043527 A1 Feb. 7, 2019

(51) Int. Cl.
| | | |
|---|---|---|
| G10L 15/00 | (2013.01) | |
| G10L 25/72 | (2013.01) | |
| G10L 25/30 | (2013.01) | |
| G10L 15/22 | (2006.01) | |
| G06F 40/30 | (2020.01) | |
| G10L 15/28 | (2013.01) | |
| G10L 15/08 | (2006.01) | |
| G10L 15/16 | (2006.01) | |

(52) U.S. Cl.
CPC .............. *G10L 25/72* (2013.01); *G06F 40/30* (2020.01); *G10L 15/005* (2013.01); *G10L 15/22* (2013.01); *G10L 25/30* (2013.01); *G10L 15/16* (2013.01); *G10L 15/28* (2013.01); *G10L 2015/088* (2013.01); *G10L 2015/223* (2013.01); *G10L 2015/225* (2013.01)

(58) Field of Classification Search
USPC .................................. 704/231–257, 270–275
See application file for complete search history.

(56) References Cited

U.S. PATENT DOCUMENTS

| | | | | |
|---|---|---|---|---|
| 9,070,366 | B1 * | 6/2015 | Mathias | .................. G10L 15/22 |
| 9,812,128 | B2 * | 11/2017 | Mixter | .................... G10L 15/32 |
| 2006/0009980 | A1 * | 1/2006 | Burke | ...................... G10L 15/30 |
| | | | | 704/270 |
| 2014/0237277 | A1 * | 8/2014 | Mallinson | ............. G06F 1/3206 |
| | | | | 713/323 |
| 2015/0255068 | A1 * | 9/2015 | Kim | ........................ G10L 17/04 |
| | | | | 704/246 |
| 2015/0287413 | A1 * | 10/2015 | Jung | ........................ G10L 15/32 |
| | | | | 704/231 |
| 2016/0148612 | A1 * | 5/2016 | Guo | ........................ G10L 15/22 |
| | | | | 704/257 |
| 2016/0342317 | A1 * | 11/2016 | Lim | ..................... G10L 15/1822 |
| 2019/0130904 | A1 * | 5/2019 | Homma | ................ G10L 15/063 |

\* cited by examiner

*Primary Examiner* — Jesse S Pullias
(74) *Attorney, Agent, or Firm* — International IP Law Group, P.L.L.C.

(57) ABSTRACT

An example apparatus for routing audio streams includes an audio receiver to receive audio from a microphone. The apparatus also includes a classifier to semantically generate a result set based on the audio. The apparatus further includes a scheduler to select a spoken language understanding (SLU) engine based on the result set. The apparatus includes a router to route the audio to the selected SLU engine.

25 Claims, 6 Drawing Sheets

ROUTING AUDIO STREAMS BASED ON SEMANTICALLY GENERATED RESULT SETS

BACKGROUND

Speech controlled devices can detect commands in speech and perform actions based on the commands. For example, speech controlled devices may include intelligent coffee making machines, music players, smart home assistants, and smart kitchen range hoods.

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

As discussed above, speech controlled devices can detect commands in speech and perform actions based on the commands. However, concurrent use of two or more speech-controlled devices may lead to unwanted actions in response to a command by one or more of the speech-controlled devices. A single command may elicit responses from two or more of the devices even though it may have been intended to be directed at one of the devices. For example, a captured speech may include sound that is similar to two or more commands on two or more devices.

The present disclosure relates generally to techniques for routing audio streams. Specifically, the techniques described herein include an apparatus, method and system for routing audio streams to speech-controlled devices using semantic analysis. An example apparatus includes an audio receiver to receive audio from a microphone. The apparatus includes a classifier to semantically generate a result set based on the audio. The apparatus further includes a scheduler to select a spoken language understanding (SLU) engine based on the result set. As used herein, an SLU engine is an apparatus that can receive audio input and output an action or intent with one or more parameters. For example, an SLU engine can output "make coffee" or "volume:=50." The apparatus also includes a router to route the audio to the selected SLU engine.

The techniques described herein thus enable multiple speech controlled devices to be used concurrently. For example, the techniques described herein may be used to send detected commands to an SLU engine and associated application most likely to be able to perform the commands. As one example, a user may be able to speak the command "hello coffee machine, make me some coffee and read me today's news" and receive both coffee and news in the same wake-up cycle. Moreover, the techniques may provide an option to send the detected commands to a different SLU engine given feedback from an application that it cannot handle a request. In addition, the techniques described herein may allow adaptation for user preferences to use local SLU engines or remote SLU engines such as cloud-based SLU engines for specific tasks. For example, local SLU engines may be used for some tasks such as home automation, while cloud-based SLU engines may be used for other tasks such as music playback.

The techniques described herein are also more efficient in terms of bandwidth and energy cost as compared to techniques that stream audio to multiple SLU engines at once. In addition, the techniques described herein are less likely to cause the same command to accidentally perform the same action on two or more devices. Moreover, by not sending all commands directly to a cloud-based SLU engine, privacy and bandwidth costs, latency, and internet availability issues can be reduced by relying on local SLU engines when available.

Figure 1:
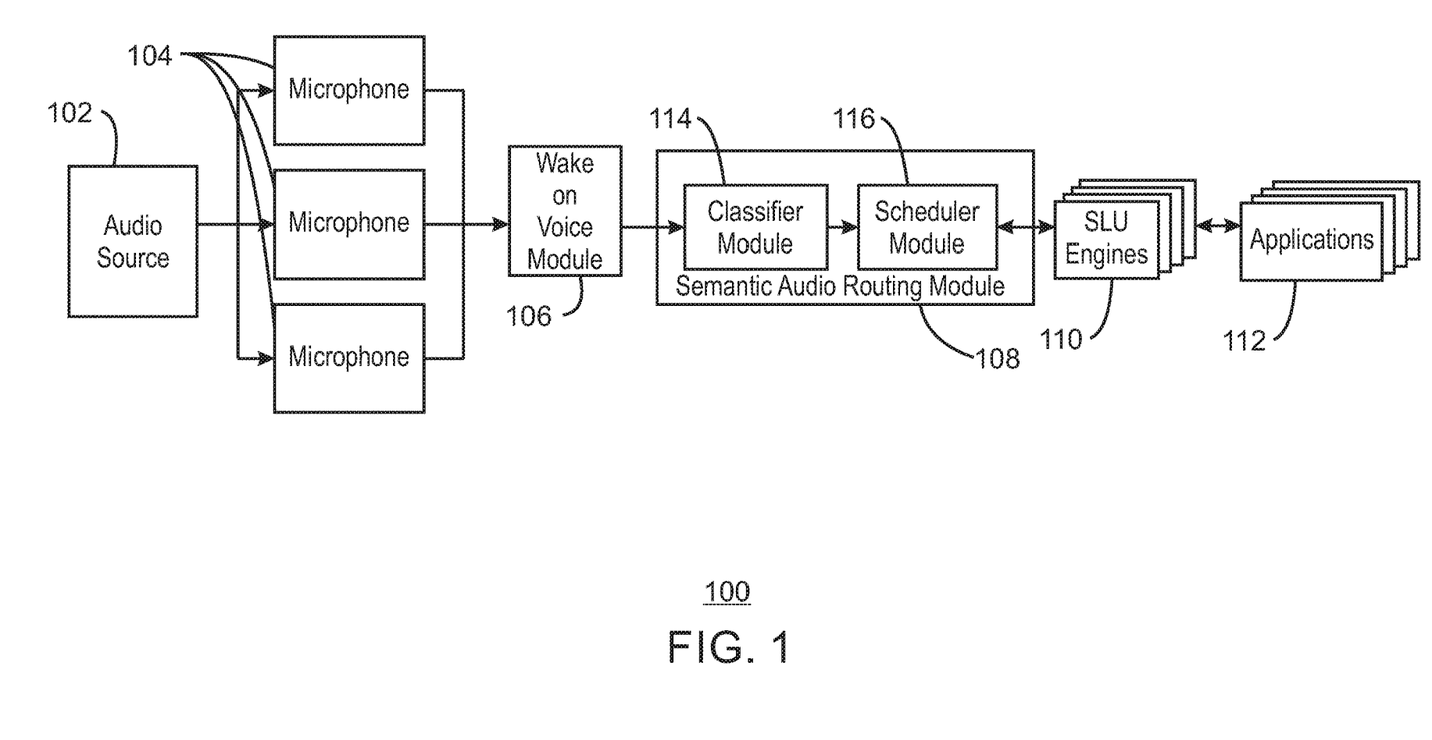
FIG. 1 is a block diagram illustrating an example system for routing audio streams using semantically generated result sets.

FIG. 1 is a block diagram illustrating an example system for routing audio streams using semantically generated result sets. The example system is referred to generally by the reference number 100 and can be implemented in the computing device 500 below in FIG. 5 using the method 400 of FIG. 4 below.

The example system 100 includes an audio source 102. For example, the audio source may be speech of a user. The example system 100 also includes one or more microphones 104 to capture the audio source 102. The system 100 includes a wake-on-voice module 106 communicatively coupled to the microphones 104. The system also includes a semantic audio routing module 108 communicatively coupled to the wake-on-voice module 106. The system 100 also further includes a number of spoken language understanding (SLU) engines 110 communicatively coupled to the semantic audio routing module 108. The system 100 also includes a number of applications 112 communicatively coupled to the SLU engines 110. For example, each of the applications 112 may be associated with a corresponding separate SLU engine 110. The semantic audio routing module 108 includes a classifier module 114 communicatively coupled to a scheduler module 116.

As shown in FIG. 1, the semantic audio routing module can receive an audio stream from the wake-on-voice module 106 and sent the audio stream to one or more SLU engines 110. For example, the audio source 102 may be the speech of a user. The microphones 104 may capture the speech and send the captured audio stream to the wake-on-voice module 106. In some examples, the wake-on-voice module 106 can detect a key phrase and send the audio stream to the semantic audio routing module 108 in response to detecting the key phrase. In some examples, the system 100 may alternatively operate in an always active mode with some modifications. For example, the modifications may include removal or deactivation of the wake-on-voice module 106. In some examples, the wake-on-voice module can include a push-to-talk button.

The classifier module 114 of the semantic audio routing module 108 can semantically classify speech. In some examples, the classifier module 114 can classify speech using a machine learning approach. For example, the classifier module 114 may be a neural network that is trained to output a result set based on the received audio stream. In some examples, the classifier 114 can include an automatic speech recognizer to transcribe received voiced audio signals into word sequence hypotheses using a statistical language model. For example, the statistical language model may be based on words, syllables, or phoneme sequences. The statistical language model may thus use a small amount of memory. In some examples, the result set may include a confidence score for each of one or more SLU engines or associated applications based on the audio. For example, one or more chunks may have been generated from the audio stream and each chunk can be assigned a separate confidence score for each of the SLU engines 110. As used herein, a chunk is a segment of an audio stream. In some examples, the classifier module 114 can apply a domain classification on top of word sequence hypotheses generated by the automatic speech recognizer. For example, the classifier module 114 can generate a weighted bag of words feature and send the weighted bag of words feature to a trained neural network to generate the result set. For example, the neural network may be a feed forward neural network. In some examples, the neural network may be a recurrent neural network with word embedding. For example, a recurrent neural network with word embedding may be used given stronger memory constraints or smaller command lists. In some examples, the classifier module 114 can be trained directly on domain data given one or more target SLU engines. The domain data may be received from each of the SLU engines 110 and may depend on the implementation of the classifier module 114. For example, the domain data can include key phrases for specific domains such as music playback, news reading, etc. In some examples, the classifier 114 can be trained directly on audio signals using training data. For example, the classifier 114 may be trained directly on audio in constrained use cases such as telephone service applications. In some examples, the classifier 114 can be a neural network trained using a phoneme-based statistical model. In some examples, the classifier 114 can be implemented using condition random fields or hidden markov models. The operation of an example set of classifiers 114 is discussed in greater detail with respect to FIG. 3 below.

The scheduler module 116 can then select an SLU engine 110 to which to route the audio stream based on an audio result set. For example, each of the one or more chunks of audio can be routed by the scheduler 116 to a particular SLU engine 110 based on the result set generated by the classifier module 114. In some examples, the scheduler 116 can assign chunks of audio to SLU engines 110 and route them to the one or more SLU engines 110 as the classifier module 114 is receiving the audio stream to be classified. In some examples, the scheduler module 116 can keep internal scores and update them continuously. For example, the scheduler 116 can move SLU pointers around in a queue and send audio 208 to an SLU engine 110 having a pointer at the top of the queue. In some examples, the scheduler module 116 can prepend buffered audio in response to detecting gaps in sending audio as discussed in greater detail with respect to FIG. 3 below.

The routed chunks of audio can be further processed by SLU engines 110 to generate actions to be sent to applications 112. For example, the actions may include commands with one or more parameters. In some examples, the semantic audio routing module 108 may also receive feedback from one or applications 112 and reroute chunks of audio accordingly. In some examples, the feedback can be used to adapt one or more models. For example, the models can be adapted based on the feedback to make the routing more precise the next time. An example data flow for the system 100 is discussed in detail with respect to FIG. 2 below.

In some examples, the classifier module 114 can be updated at run-time to adapt to certain user behaviors or feedback. For example, the classifier module 114 can be trained over time to detect that a user prefers local SLU engines for commands associated with specific tasks. In some examples, local SLU engines may be used to perform home automation tasks, among other suitable tasks. In some examples, remote SLU engines can be used to perform other sets of tasks. For example, cloud-based SLU engines can be used to perform tasks such as music playback. In some examples, a model for the classifier module 114 can be adapted at runtime based on user input. For example, the user input may be responses to one or more prompts.

In some examples, the semantic audio routing module 108 can also incorporate feedback from one or more applications 112. For example, an application 112 may return a response that the application 112 cannot handle a specific command or request. The scheduler module 116 can reroute the audio to an SLU engine with a next highest confidence score. For example, the scheduler module 116 can send audio to a first local SLU engine to identify the title of a song. In some examples, if the local SLU engine is unable to identify the title of the song, then the scheduler module 116 can reroute the audio to a cloud-based SLU engine for identifying the song. For example, the cloud-based SLU engine may have been trained using a larger training set and be more likely to identify songs that are more difficult to identify. In some examples, the local SLU engine may be set to be routed to before the remote SLU engine using some manually set confidence score. In some examples, cloud-based service opt in/opt out preferences for a user may be set by prompting a user for permission to use the cloud-based SLU engines. In some examples, the feedback can also be used to adapt one or more models. For example, the models can be adapted based on the feedback to make the routing more precise the next time. Thus, songs associated with a particular band or artist may be routed to a different SLU engine in subsequent routing, such as a cloud-based SLU engine, in response to receiving the feedback.

The diagram of FIG. 1 is not intended to indicate that the example system 100 is to include all of the components shown in FIG. 1. Rather, the example system 100 can be implemented using fewer or additional components not illustrated in FIG. 1 (e.g., additional audio sources, microphones, modules, SLU engines, applications, etc.).

Figure 2:
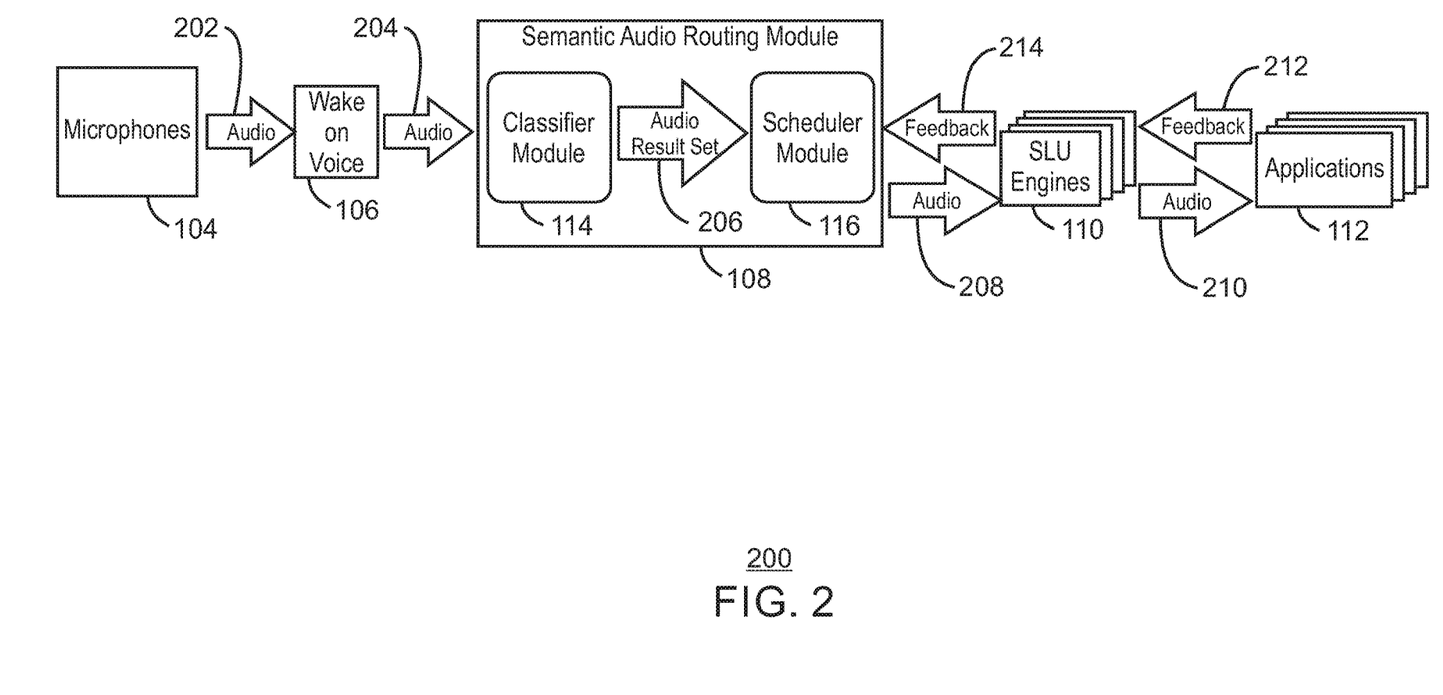
FIG. 2 is a block diagram illustrating an example data flow for routing audio streams using semantically generated result sets.

FIG. 2 is a block diagram illustrating an example data flow for routing audio streams using semantically generated result sets. The example system is referred to generally by the reference number 200 and can be implemented in the computing device 500 below in FIG. 5 using the method 400 of FIG. 4 below.

The example system 200 includes similarly numbered elements from FIG. 1. In addition, FIG. 2 shows an example data flow between the elements of FIG. 1.

As shown in FIG. 2, the microphones capture audio 202 and send the audio 202 to the wake-on-voice module 106. For example, the audio 202 may be a stream of speech audio. The wake-on-voice module may detect one or more key phrases and send audio 204 to the semantic audio routing module 108. In some examples, the audio 204 may be sent as chunks of audio. For example, audio 204 may be audio 202 split into two or more chunks.

The classifier module 114 of the semantic audio routing module 108 may receive the audio 204 and generate an audio result set 206 to be sent to the scheduler module 116. For example, the audio result set 206 may include a result set and the audio. In some examples, the result set may include a set of confidence scores for the SLU engines for each audio chunk. The output of the scheduler module 116 may be an audio 208 that is sent to a particular SLU engine of the SLU engines 110. In some examples, the audio 208 may be sent to a particular SLU engine 110 based on the set of confidence scores. For example, the audio 208 may be sent to an SLU engine 110 associated with a higher confidence score than other SLU engines 110. The audio 208 may include one or more chunks of the audio 204.

The diagram of FIG. 2 is not intended to indicate that the example system 200 is to include all of the components shown in FIG. 2. Rather, the example system 200 can be implemented using fewer or additional components not illustrated in FIG. 2 (e.g., additional feedback, audio, microphones, modules, SLU engines, applications, etc.).

Figure 3:
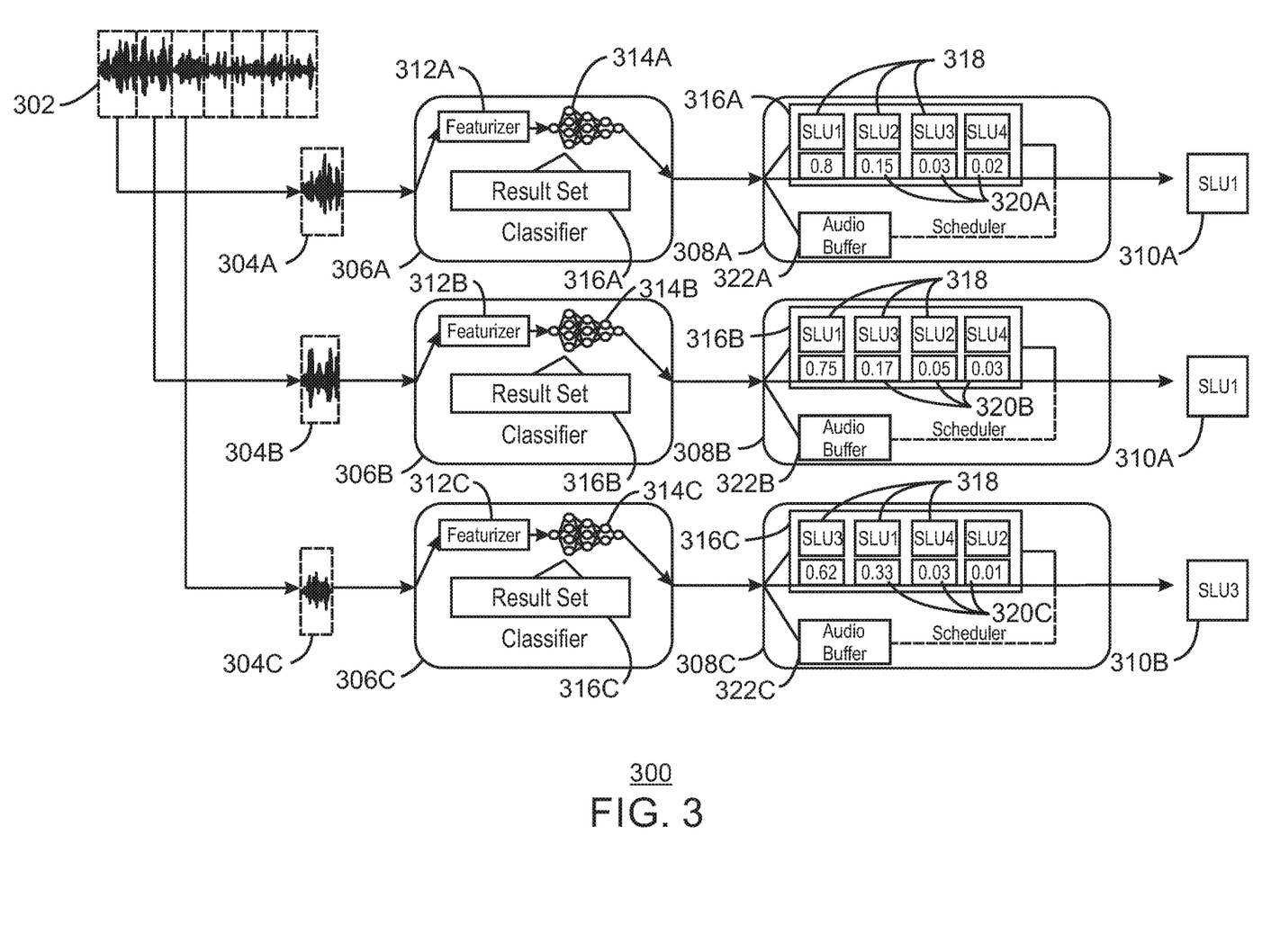
FIG. 3 is a detailed diagram illustrating an example system for routing chunks of audio streams using semantically generated result sets.

FIG. 3 is a block diagram illustrating an example system for routing chunks of audio streams using semantically generated result sets. The example system is referred to generally by the reference number 300 and can be implemented in the computing device 500 below in FIG. 5 using the method 400 of FIG. 4 below.

The example system 300 includes an audio stream 302 and a set of audio chunks 304A, 304B, 304C corresponding to segments of the audio stream 302. The audio chunks 304A, 304B, 304C are shown being sent to classifiers 306A, 306B, 306C, respectively. The classifiers 306A, 306B, 306C are communicatively connected to schedulers 308A, 308B, and 308C, respectively. The schedulers 308A, 308B, and 308C are communicatively connected to SLU engine 1 310A and SLU engine 3 310B, respectively, among other SLU engines not shown. The classifiers 306A, 306B, 306C include featurizers 312A, 312B, and 312C and neural networks 314A, 314B, and 314C. The neural networks 314A, 314B, and 314C are shown generating result sets 316A, 316B, and 316C, respectively. The schedulers 308A, 308B, and 308C include result sets 316A, 316B, and 316C, respectively. The result sets 316A, 316B, and 316C include a list of SLU engines 318 and corresponding confidence scores 320A, 320B, and 320C. In addition, the schedulers 308A, 308B, and 308C include audio buffers 322A, 322B, and 322C, respectively.

As shown in FIG. 3, the audio stream 320 can be used to generate chunks of audio 304A, 304B, 304C that can be input into classifiers 306A, 306B, and 306C, respectively. The featurizers 312A, 312B, 312C can generate features based on the audio chunks 304A, 304B, and 304C. For example, the features may be weighted bag of words features. The features can be input into the neural networks 314A, 314B, and 314C. For example, the neural networks 314A, 314B, 314C may be feed forward neural networks, recurrent neural networks, or any other suitable neural network. In some examples, the neural networks 314A, 314B, 314C may be recurrent neural networks with word embedding. In some examples, the neural networks 314A, 314B, 314C may be feed forward neural networks with at least two hidden layers. The neural networks 314A, 314B, 314C can be used to calculate results sets 316A, 316B, and 316C for each of the audio chunks with respect to each of the SLU engines in a set of SLU engines 318. For example, the set of SLU engines 318 may be pointers to a set of associated SLU engines. For example, the result sets 316A, 316B, and 316C may include a set of confidence scores 320A, 320B, 320C for each of the SLU engines in the SLU engine list 318. As shown in FIG. 3, the confidence scores are ordered from highest to lowest confidence score. As mentioned above, in some examples, the schedulers 308A, 308B, 308C can keep internal confidence scores and update the confidence scores continuously. For example, the schedulers 308A, 308B, and 308C can move SLU pointers 318 around in a queue and send audio to an SLU engine 310A or 310B having a pointer at the top of the queue.

The audio chunks 304A, 304B, and 304C can then be routed to SLU engines 310A, 310B, based on the confidence scores 320A, 320B, and 320C. For example, the confidence score of 0.8 for SLU engine 1 310A is larger for audio chunk 304A than the confidence scores of 0.15, 0.03 and 0.02 for SLU engine 2, SLU engine 3 310B, and SLU engine 4. Thus, the scheduler 308A may route audio chunk 304A to SLU engine 1 310A. Similarly, the confidence score for SLU engine 1 310A of 0.75 for audio chunk 304B is higher than the other confidence scores 05, 0.17, and 0.03 for SLU engine 2, SLU engine 3 310B and SLU engine 4, respectively. Thus, the scheduler 308B may send audio chunk 304B to SLU engine 1 310A accordingly. Likewise, the confidence score 320C of 0.62 for SLU engine 3 310B may result in audio chunk 304C being routed to SLU engine 3 310B.

In some examples, the scheduler 308C can prepend buffered audio from the audio buffer 322C in response to detecting gaps in sending audio. For example, since the top scored SLU engine changed from SLU engine 1 310A to SLU engine 3 310B, this may result in a gap in sending audio. The gap may be a result of sending audio chunks chunk 304A and chunk 304B to SLU engine 310A and not to the SLU engine 310B, which may prevent the SLU engine 310B from recognizing the audio 302 correctly. Thus, the scheduler 308C can sent buffered audio corresponding to chunk 304A and chunk 304B to the SLU engine 3 310B in addition to the audio chunk 304C.

The diagram of FIG. 3 is not intended to indicate that the example system 300 is to include all of the components shown in FIG. 3. Rather, the example system 300 can be implemented using fewer or additional components not illustrated in FIG. 3 (e.g., additional audio chunks, classifiers, schedulers, featurizers, result sets, SLU engines, audio buffers, etc.).

Figure 4:
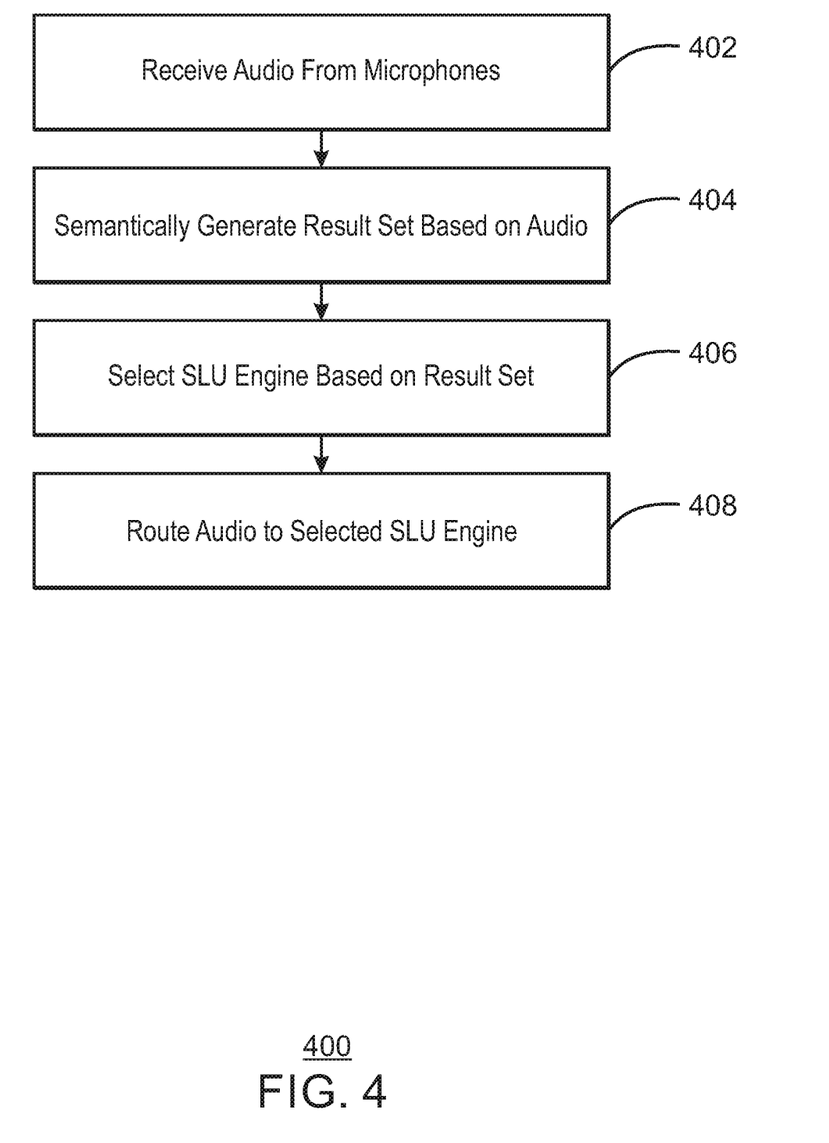
FIG. 4 is a flow chart illustrating a method for routing audio streams using semantically generated result sets.

FIG. 4 is a flow chart illustrating a method for routing audio streams using semantically generated result sets. The example method is generally referred to by the reference number 400 and can be implemented in the system 100, 200, or 300 of FIGS. 1-3 above, the processor 502 of the computing device 500 of FIG. 5 below, or the computer readable media 600 of FIG. 6 below.

At block 402, a processor receives audio from a microphone. For example, the audio may be an audio stream that includes speech from one or more users. In some examples, the processor can generate a plurality of chunks based on the received audio. In some examples, the processor can receive audio from the microphone in response to detection of a key phrase at a wake-on-voice engine.

At block 404, the processor semantically generates a result set based on the audio. For example, the processor can process the audio using a neural network that is trained directly on audio using received training data including commands for different speech-controlled devices. In some examples, the processor can generate a result set for each of a plurality of chunks.

At block 406, the processor selects a spoken language understanding (SLU) engine based on the result set. For example, the processor can select an SLU engine associated with a higher confidence score than other SLU engines in a list of SLU engines and associated confidence scores. In some examples, the processor can select the SLU engine for a chunk of a plurality of chunks based on the result set associated with the chunk.

At block 408, the processor routes the audio to the selected SLU engine. For example, the selected SLU engine can be a local SLU engine or a remote SLU engine, such as a cloud-based SLU engine. In some examples, the processor can route one or more chunks generated based on the audio to the selected SLU engine.

This process flow diagram is not intended to indicate that the blocks of the example process 400 are to be executed in any particular order, or that all of the blocks are to be included in every case. Further, any number of additional blocks not shown may be included within the example process 400, depending on the details of the specific implementation. For example, the method 400 can also include generating, via the processor, an action based on the streamed audio, and sending the action to a smart appliance associated with the selected SLU engine. A smart appliance, as used herein, is an appliance that is communicatively coupled to a computing device. For example, the smart appliance can be connected to the computing device via the Internet, via a local connection such as a wireless connection or wired connection. In some examples, the computing device may be within the smart appliance. In some examples, the method can include modifying, via the processor, a classifier at runtime based on a user input. In some examples, the method 400 can include receiving, at a scheduler, feedback from an application associated with the selected SLU engine, and routing the audio to a second SLU engine in response to receiving the feedback from an application. In some examples, the feedback can be used to adapt one or more models. For example, the models can be adapted based on the feedback to make the routing more precise the next time. In some examples, the method 400 can include training, via the processor, a classifier based on user responses to prompts to detect a preference for sending the audio to a local SLU engine or a cloud-based SLU engine. For example, the method 400 can also include displaying a prompt including privacy options, and receiving user feedback including a consent to send the audio to a cloud SLU engine. In some examples, the method 400 can include continuously receiving, via the processor, audio from the microphone in response to receiving the user feedback including the consent.

Figure 5:
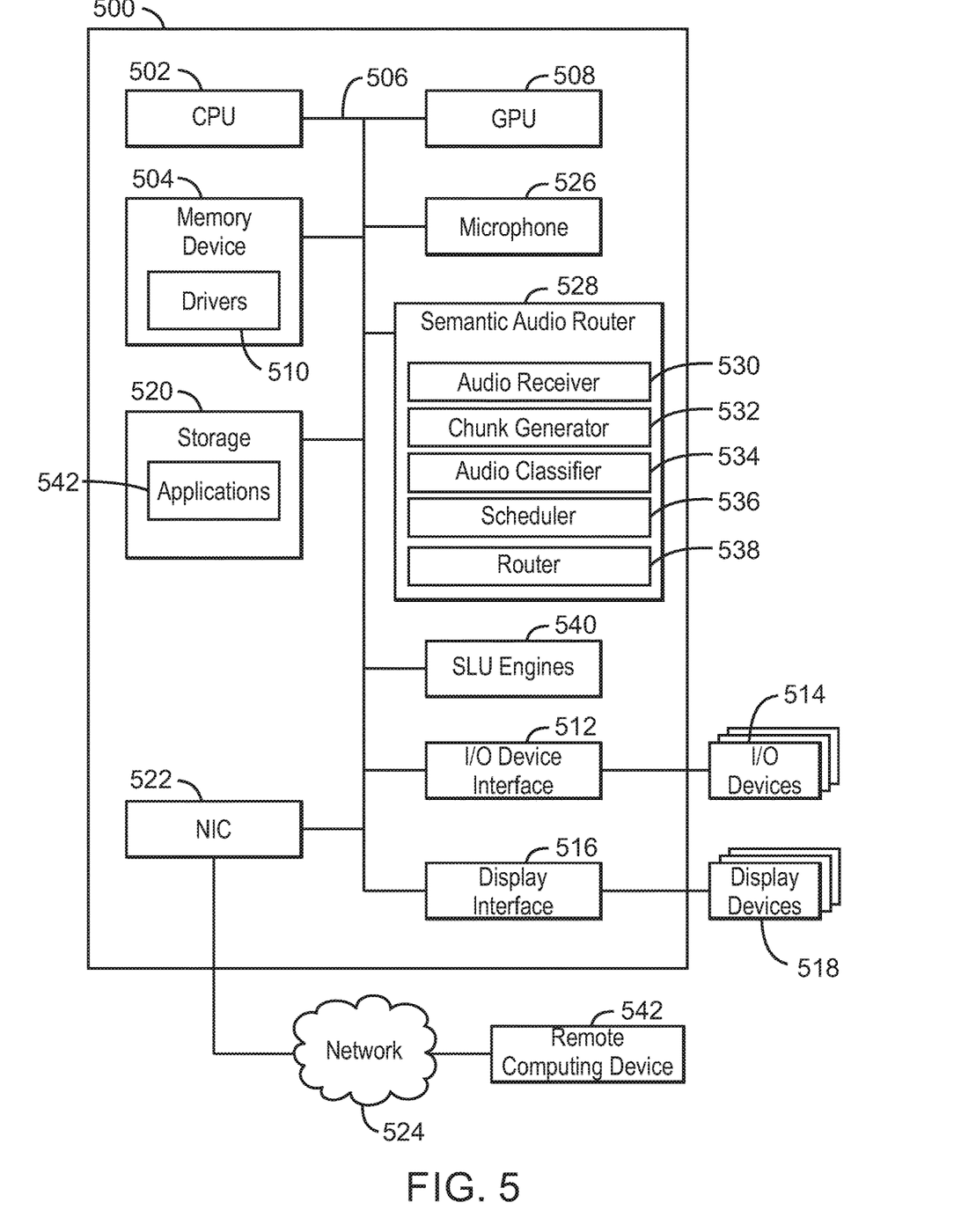
FIG. 5 is block diagram illustrating an example computing device that can route audio streams using semantically generated result sets.

Referring now to FIG. 5, a block diagram is shown illustrating an example computing device that can route audio streams using semantically generated result sets. The computing device 500 may be, for example, a laptop computer, desktop computer, tablet computer, mobile device, or wearable device, among others. In some examples, the computing device 500 may be a smart appliance. For example, the computing device 500 may be an intelligent coffee making machine, music player, smart home assistant, news reader, home butler device, or smart kitchen range hood. In some examples, the computing device 500 may be a central hub that is connected to a number of smart appliances. The computing device 500 may include a central processing unit (CPU) 502 that is configured to execute stored instructions, as well as a memory device 504 that stores instructions that are executable by the CPU 502. The CPU 502 may be coupled to the memory device 504 by a bus 506. Additionally, the CPU 502 can be a single core processor, a multi-core processor, a computing cluster, or any number of other configurations. Furthermore, the computing device 500 may include more than one CPU 502. In some examples, the CPU 502 may be a system-on-chip (SoC) with a multi-core processor architecture. In some examples, the CPU 502 can be a specialized digital signal processor (DSP) used for image processing. The memory device 504 can include random access memory (RAM), read only memory (ROM), flash memory, or any other suitable memory systems. For example, the memory device 504 may include dynamic random access memory (DRAM).

The memory device 504 can include random access memory (RAM), read only memory (ROM), flash memory, or any other suitable memory systems. For example, the memory device 504 may include dynamic random access memory (DRAM).

The computing device 500 may also include a graphics processing unit (GPU) 508. As shown, the CPU 502 may be coupled through the bus 506 to the GPU 508. The GPU 508 may be configured to perform any number of graphics operations within the computing device 500. For example, the GPU 508 may be configured to render or manipulate graphics images, graphics frames, videos, or the like, to be displayed to a user of the computing device 500.

The memory device 504 can include random access memory (RAM), read only memory (ROM), flash memory, or any other suitable memory systems. For example, the memory device 504 may include dynamic random access memory (DRAM). The memory device 504 may include device drivers 510 that are configured to execute the instructions for semantically generating result sets and routing audio streams based on the semantically generated result sets. The device drivers 510 may be software, an application program, application code, or the like.

The CPU 502 may also be connected through the bus 506 to an input/output (I/O) device interface 512 configured to connect the computing device 500 to one or more I/O devices 514. The I/O devices 514 may include, for example, a keyboard and a pointing device, wherein the pointing device may include a touchpad or a touchscreen, among others. The I/O devices 514 may be built-in components of the computing device 500, or may be devices that are externally connected to the computing device 500. In some examples, the memory 504 may be communicatively coupled to I/O devices 514 through direct memory access (DMA).

The CPU 502 may also be linked through the bus 506 to a display interface 516 configured to connect the computing device 500 to a display device 518. The display device 518 may include a display screen that is a built-in component of the computing device 500. The display device 518 may also include a computer monitor, television, or projector, among others, that is internal to or externally connected to the computing device 500.

The computing device 500 also includes a storage device 520. The storage device 520 is a physical memory such as a hard drive, an optical drive, a thumbdrive, an array of drives, a solid-state drive, or any combinations thereof. The storage device 520 may also include remote storage drives.

The computing device 500 may also include a network interface controller (NIC) 522. The NIC 522 may be configured to connect the computing device 500 through the bus 506 to a network 524. The network 524 may be a wide area network (WAN), local area network (LAN), or the Internet, among others. In some examples, the device may communicate with other devices through a wireless technology. For example, the device may communicate with other devices via a wireless local area network connection. In some examples, the device may connect and communicate with other devices via Bluetooth® or similar technology.

The computing device 500 further includes microphones 526. For example, the microphones 526 may include transducers that convert sound into electrical signals. In some example, the microphones 526 may be condenser microphones, dynamic microphones, ribbon microphones, carbon microphones, piezoelectric microphones, fiber optic microphones, laser microphones, MicroElectrical-Mechanical System (MEMS) microphones, etc.

The computing device 500 further includes a semantic audio router 528. For example, the semantic audio router 528 can be used to route chunks of an audio stream to one or more SLU engines. The semantic audio router 528 can include an audio receiver 530, a chunk generator 532, an audio classifier 534, a scheduler 536, and a router 538. In some examples, each of the components 530-538 of the semantic audio router 528 may be a microcontroller, embedded processor, or software module. The audio receiver 530 can receive audio from a microphone. In some examples, the audio may be an audio stream containing speech. For example, the audio receiver 530 can receive audio from the microphone in response to detection of a key phrase at a wake-on-voice engine. The chunk generator 532 can generate one or more chunks of audio based on the received audio. The audio classifier 534 can semantically generate a result set based on the audio. For example, the audio classifier 534 can generate confidence scores for a list of SLU engines based on each audio chunk. For example, each of the SLU engines in the list of SLU engines may be associated with a different smart appliance. In some examples, the classifier may be a neural network that is trained directly on audio using received training data including commands for different speech-controlled devices. The scheduler 536 can select a spoken language understanding (SLU) engine for each audio chunk based on the result set corresponding to each audio chunk. The router 538 can then route the audio to the selected SLU engine.

In some examples, the audio receiver 530 can receive feedback from an application associated with the selected SLU engine. For example, the feedback may indicate a preference for a different SLU engine. The router 538 can route the audio to a second SLU engine in response to receiving the feedback from the application.

In some examples, the selected SLU engine can receive the streamed audio. For example, the selected SLU engine may be one of the SLU engines 540 of the computing device 500. The selected SLU engine can then generate an action based on the streamed audio. The selected SLU engine can then send the action to a smart appliance associated with the selected SLU engine.

In some examples, the audio receiver 530 can also cause the display of a prompt including privacy options and receive user feedback including a consent to enable use of a cloud SLU engine. For example, the selected SLU engine may then be a cloud SLU engine. In some examples, the audio receiver 530 can continuously receive audio from the microphone in response to receiving the user feedback including the consent.

The storage device 520 includes one or more applications 542. For example, the applications 542 may be associated with one or more smart appliances. In some examples, an application 542 may receive one or more actions from a corresponding SLU engine 540 and perform the one or more actions.

In some examples, the computing device 500 may be communicatively coupled via the network 524 to a remote computing device 542. For example, the remote computing device 542 may be a cloud server. In some examples, the remote computing device 542 may include one or more SLU engines. For example, the computing device 500 can send audio chunks to one or more of the SLU engines of the remote computing device 542. The computing device 500 can then receive one or more actions to be performed from the remote computing device 542. For example, the actions may be performed by one or more of the applications 542. In some examples, the remote computing device 542 may also include additional data such as media to be played back in response to one or more commands. For example, the remote computing device 542 may include or be communicatively coupled to a database including music, movies, news, etc.

The block diagram of FIG. 5 is not intended to indicate that the computing device 500 is to include all of the components shown in FIG. 5. Rather, the computing device 500 can include fewer or additional components not illustrated in FIG. 5, such as additional buffers, additional processors, and the like. The computing device 500 may include any number of additional components not shown in FIG. 5, depending on the details of the specific implementation. Furthermore, any of the functionalities of the audio receiver 530, the chunk generator 532, the audio classifier 534, the scheduler 536, the router 538, and the SLU engines 540, may be partially, or entirely, implemented in hardware and/or in the processor 502. For example, the functionality may be implemented with an application specific integrated circuit, in logic implemented in the processor 502, or in any other device. In addition, any of the functionalities of the CPU 502 may be partially, or entirely, implemented in hardware and/or in a processor. For example, the functionality of the semantic audio router 528 may be implemented with an application specific integrated circuit, in logic implemented in a processor, in logic implemented in a specialized audio processing unit, or in any other device.

Figure 6:
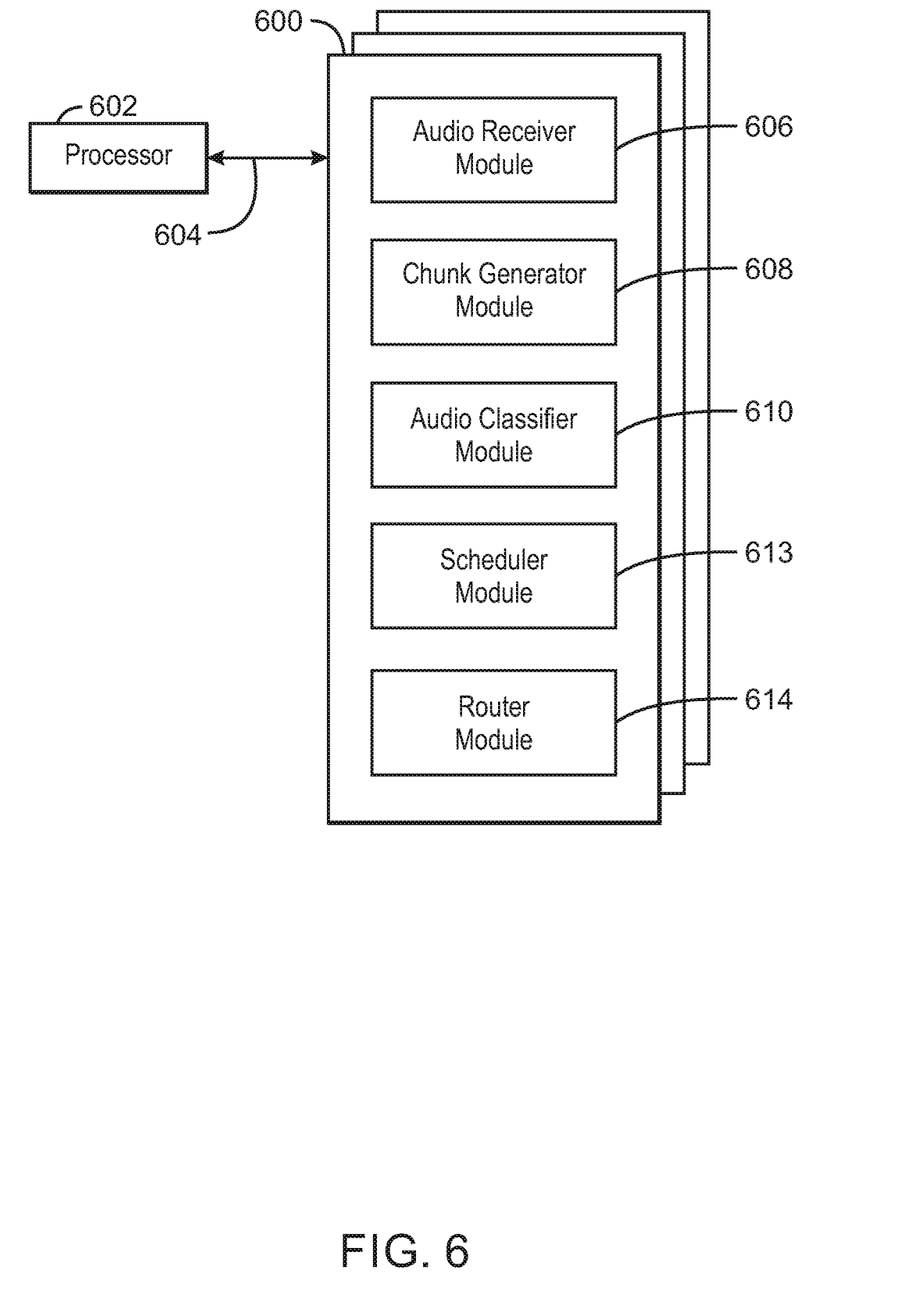
FIG. 6 is a block diagram showing computer readable media that store code for routing audio streams using semantically generated result sets.

FIG. 6 is a block diagram showing computer readable media 600 that store code for routing audio streams using semantically generated result sets. The computer readable media 600 may be accessed by a processor 602 over a computer bus 604. Furthermore, the computer readable medium 600 may include code configured to direct the processor 602 to perform the methods described herein. In some embodiments, the computer readable media 600 may be non-transitory computer readable media. In some examples, the computer readable media 600 may be storage media.

The various software components discussed herein may be stored on one or more computer readable media 600, as indicated in FIG. 6. For example, an audio receiver module 606 may be configured to receive audio from a microphone. In some examples, the audio receiver module 606 may be configured to receive audio from the microphone in response to detection of a key phrase at a wake-on-voice engine. In some examples, the audio receiver module 606 may also be configured to receive feedback from an application associated with the selected SLU engine. A chunk generator module 608 may be configured to generate a plurality of chunks based on the received audio. An audio classifier module 610 may be configured to semantically generate a result set based on the audio. For example, the audio classifier module 610 may be configured to process the audio using a neural network. For example, the neural network may be trained directly on audio using received training data including commands for different speech-controlled devices. In some examples, the audio classifier module 610 may be configured to generate a result set for each of a plurality of chunks. A scheduler module 612 may be configured to select a spoken language understanding (SLU) engine based on the result set. For example, the scheduler module 612 may be configured to select an SLU engine for each of the plurality of chunks based on the result set associated with each of the chunks. A router module 614 may be configured to route the audio to the selected SLU engine. For example, the router module 614 may be configured to stream each of the chunks to the selected SLU engine for each of the chunks. In some examples, the router module 614 may be configured to route the audio to a second SLU engine in response to receiving the feedback from an application. For example, the feedback may be received from an application associated with the selected SLU engine. In some examples, a privacy module may be configured to display a prompt including privacy options. The audio receiver module 606 may be configured to receive the audio from the microphone in response to receiving user feedback including a consent to send the audio to a cloud SLU engine. In some examples, the audio receiver module 606 may be configured to continuously receive audio from the microphone in response to receiving the user feedback including the consent.

The block diagram of FIG. 6 is not intended to indicate that the computer readable media 600 is to include all of the components shown in FIG. 6. Further, the computer readable media 600 may include any number of additional components not shown in FIG. 6, depending on the details of the specific implementation. For example, an SLU engine module may be configured to generate an action based on the streamed audio and send the action to a smart appliance associated with the selected SLU engine. A trainer module may be configured to directly trainer a classifier based on audio in received training data including commands for different speech-controlled devices. In some examples, the trainer module may be configured to modify the classifier at runtime based on a user input. For example, the trainer module may be configured to train the classifier based on user responses to prompts to detect a preference for sending the audio to a local SLU engine or a cloud-based SLU engine.

EXAMPLES

Example 1 is an apparatus for routing audio streams. The apparatus includes an audio receiver to receive audio from a microphone. The apparatus also includes a classifier to semantically generate a result set based on the audio. The apparatus further includes a scheduler to select a spoken language understanding (SLU) engine based on the result set; and a router to route the audio to the selected SLU engine.

Example 2 includes the apparatus of example 1, including or excluding optional features. In this example, the SLU engine is one of a plurality of SLU engines, each SLU engine associated with a different smart appliance.

Example 3 includes the apparatus of any one of examples 1 to 2, including or excluding optional features. In this example, the selected SLU engine is to receive the streamed audio, generate an action based on the streamed audio, and send the action to a smart appliance associated with the selected SLU engine.

Example 4 includes the apparatus of any one of examples 1 to 3, including or excluding optional features. In this example, the result set includes a set of confidence scores calculated for a list of a plurality of SLU engines based on a chunk of the audio.

Example 5 includes the apparatus of any one of examples 1 to 4, including or excluding optional features. In this example, the scheduler is to further receive feedback from an application associated with the selected SLU engine and route the audio to a second SLU engine in response to receiving the feedback from the application.

Example 6 includes the apparatus of any one of examples 1 to 5, including or excluding optional features. In this example, the apparatus includes a chunk generator to generate a plurality of chunks based on the received audio. The classifier is to generate a result set for each of the plurality of chunks. The scheduler is to select an SLU engine for each of the plurality of chunks based on the result set associated with each of the chunks. The router is to stream each of the chunks to the selected SLU engine for each of the chunks.

Example 7 includes the apparatus of any one of examples 1 to 6, including or excluding optional features. In this example, the audio receiver is to receive audio from the microphone in response to detection of a key phrase at a wake-on-voice engine.

Example 8 includes the apparatus of any one of examples 1 to 7, including or excluding optional features. In this example, the classifier includes a neural network that is trained directly on audio using received training data including commands for different speech-controlled devices.

Example 9 includes the apparatus of any one of examples 1 to 8, including or excluding optional features. In this example, the audio receiver is to cause the display of a prompt including privacy options and receive user feedback including a consent to enable use of a cloud SLU engine. The selected SLU engine includes the cloud SLU engine.

Example 10 includes the apparatus of any one of examples 1 to 9, including or excluding optional features. In this example, the audio receiver is to continuously receive audio from the microphone in response to receiving the user feedback including the consent.

Example 11 is a method for routing audio streams. The method includes receiving, via a processor, audio from a microphone. The method also includes semantically generating, via the processor, a result set based on the audio. The method further includes selecting, via the processor, a spoken language understanding (SLU) engine based on the result set. The method also further includes and routing, via the processor, the audio to the selected SLU engine.

Example 12 includes the method of example 11, including or excluding optional features. In this example, semantically generating the result set includes processing the audio using a neural network that is trained directly on audio using received training data including commands for different speech-controlled devices.

Example 13 includes the method of any one of examples 11 to 12, including or excluding optional features. In this example, the method includes generating, at the selected SLU engine, an action based on the streamed audio, and sending the action to a smart appliance associated with the selected SLU engine.

Example 14 includes the method of any one of examples 11 to 13, including or excluding optional features. In this example, the method includes modifying, via the processor, the classifier at runtime based on a user input.

Example 15 includes the method of any one of examples 11 to 14, including or excluding optional features. In this example, the method includes receiving, via the processor, feedback from an application associated with the selected SLU engine, and routing the audio to a second SLU engine in response to receiving the feedback from an application.

Example 16 includes the method of any one of examples 11 to 15, including or excluding optional features. In this example, the method includes generating, via the processor, a plurality of chunks based on the received audio. Generating the result set includes generating a result set for each of the plurality of chunks. Selecting the SLU engine includes selecting the SLU engine for a chunk of the plurality of chunks based on the result set associated with the chunk. Routing the audio includes routing the chunk to the selected SLU engine.

Example 17 includes the method of any one of examples 11 to 16, including or excluding optional features. In this example, the method includes receiving, via the processor, audio from the microphone in response to detection of a key phrase at a wake-on-voice engine.

Example 18 includes the method of any one of examples 11 to 17, including or excluding optional features. In this example, the method includes training, via the processor, the classifier based on user responses to prompts to detect a preference for sending the audio to a local SLU engine or a cloud-based SLU engine.

Example 19 includes the method of any one of examples 11 to 18, including or excluding optional features. In this example, the method includes displaying a prompt including privacy options, and receiving user feedback including a consent to send the audio to a cloud SLU engine.

Example 20 includes the method of any one of examples 11 to 19, including or excluding optional features. In this example, the method includes continuously receiving, via the processor, audio from the microphone in response to receiving the user feedback including the consent.

Example 21 is at least one computer readable medium for routing audio streams having instructions stored therein that. The computer-readable medium includes instructions that direct the processor to receive audio from a microphone; semantically generate a result set based on the audio. The computer-readable medium also includes instructions that direct the processor to select a spoken language understanding (SLU) engine based on the result set. The computer-readable medium further includes instructions that direct the processor to and route the audio to the selected SLU engine.

Example 22 includes the computer-readable medium of example 21, including or excluding optional features. In this example, the computer-readable medium includes instructions to process the audio using a neural network that is trained directly on audio using received training data including commands for different speech-controlled devices.

Example 23 includes the computer-readable medium of any one of examples 21 to 22, including or excluding optional features. In this example, the computer-readable medium includes instructions to generate an action based on the streamed audio and send the action to a smart appliance associated with the selected SLU engine.

Example 24 includes the computer-readable medium of any one of examples 21 to 23, including or excluding optional features. In this example, the computer-readable medium includes instructions to modify the classifier at runtime based on a user input.

Example 25 includes the computer-readable medium of any one of examples 21 to 24, including or excluding optional features. In this example, the computer-readable medium includes instructions to receive feedback from an application associated with the selected SLU engine and route the audio to a second SLU engine in response to receiving the feedback from an application.

Example 26 includes the computer-readable medium of any one of examples 21 to 25, including or excluding optional features. In this example, the computer-readable medium includes instructions to generate a plurality of chunks based on the received audio, generate a result set for each of the plurality of chunks, select the SLU engine for a chunk of the plurality of chunks based on the result set associated with the chunk, and route the chunk to the selected SLU engine.

Example 27 includes the computer-readable medium of any one of examples 21 to 26, including or excluding optional features. In this example, the computer-readable medium includes instructions to receive audio from the microphone in response to detection of a key phrase at a wake-on-voice engine.

Example 28 includes the computer-readable medium of any one of examples 21 to 27, including or excluding optional features. In this example, the computer-readable medium includes instructions to train the classifier based on user responses to prompts to detect a preference for sending the audio to a local SLU engine or a cloud-based SLU engine.

Example 29 includes the computer-readable medium of any one of examples 21 to 28, including or excluding optional features. In this example, the computer-readable medium includes instructions to display a prompt including privacy options and receive user feedback including a consent to send the audio to a cloud SLU engine.

Example 30 includes the computer-readable medium of any one of examples 21 to 29, including or excluding optional features. In this example, the computer-readable medium includes instructions to continuously receive audio from the microphone in response to receiving the user feedback including the consent.

Example 31 is a system for routing audio streams. The system includes an audio receiver to receive audio from a microphone. The system also includes a classifier to semantically generate a result set based on the audio. The system further includes a scheduler to select a spoken language understanding (SLU) engine based on the result set. The system also further includes a router to route the audio to the selected SLU engine.

Example 32 includes the system of example 31, including or excluding optional features. In this example, the SLU engine is one of a plurality of SLU engines, each SLU engine associated with a different smart appliance.

Example 33 includes the system of any one of examples 31 to 32, including or excluding optional features. In this example, the selected SLU engine is to receive the streamed audio, generate an action based on the streamed audio, and send the action to a smart appliance associated with the selected SLU engine.

Example 34 includes the system of any one of examples 31 to 33, including or excluding optional features. In this example, the result set includes a set of confidence scores calculated for a list of a plurality of SLU engines based on a chunk of the audio.

Example 35 includes the system of any one of examples 31 to 34, including or excluding optional features. In this example, the scheduler is to further receive feedback from an application associated with the selected SLU engine and route the audio to a second SLU engine in response to receiving the feedback from the application.

Example 36 includes the system of any one of examples 31 to 35, including or excluding optional features. In this example, the system includes a chunk generator to generate a plurality of chunks based on the received audio. The classifier is to generate a result set for each of the plurality of chunks. The scheduler is to select an SLU engine for each of the plurality of chunks based on the result set associated with each of the chunks. The router is to stream each of the chunks to the selected SLU engine for each of the chunks.

Example 37 includes the system of any one of examples 31 to 36, including or excluding optional features. In this example, the audio receiver is to receive audio from the microphone in response to detection of a key phrase at a wake-on-voice engine.

Example 38 includes the system of any one of examples 31 to 37, including or excluding optional features. In this example, the classifier includes a neural network that is trained directly on audio using received training data including commands for different speech-controlled devices.

Example 39 includes the system of any one of examples 31 to 38, including or excluding optional features. In this example, the audio receiver is to cause the display of a prompt including privacy options and receive user feedback including a consent to enable use of a cloud SLU engine. The selected SLU engine includes the cloud SLU engine.

Example 40 includes the system of any one of examples 31 to 39, including or excluding optional features. In this example, the audio receiver is to continuously receive audio from the microphone in response to receiving the user feedback including the consent.

Example 41 is a system for routing audio streams. The system includes means for receiving audio from a microphone. The system also includes means for semantically generating a result set based on the audio. The system further includes means for selecting a spoken language understanding (SLU) engine based on the result set. The system also further includes means for routing the audio to the selected SLU engine.

Example 42 includes the system of example 41, including or excluding optional features. In this example, the SLU engine is one of a plurality of SLU engines, each SLU engine associated with a different smart appliance.

Example 43 includes the system of any one of examples 41 to 42, including or excluding optional features. In this example, the selected SLU engine is to receive the streamed audio, generate an action based on the streamed audio, and send the action to a smart appliance associated with the selected SLU engine.

Example 44 includes the system of any one of examples 41 to 43, including or excluding optional features. In this example, the result set includes a set of confidence scores calculated for a list of a plurality of SLU engines based on a chunk of the audio.

Example 45 includes the system of any one of examples 41 to 44, including or excluding optional features. In this example, the means for selecting the SLU engine is to further receive feedback from an application associated with the selected SLU engine and route the audio to a second SLU engine in response to receiving the feedback from the application.

Example 46 includes the system of any one of examples 41 to 45, including or excluding optional features. In this example, the system includes means for generating a plurality of chunks based on the received audio. The means for semantically generating the result set is to generate a result set for each of the plurality of chunks. The means for selecting the SLU engine is to select an SLU engine for each of the plurality of chunks based on the result set associated with each of the chunks. The means for routing the audio is to stream each of the chunks to the selected SLU engine for each of the chunks.

Example 47 includes the system of any one of examples 41 to 46, including or excluding optional features. In this example, the means for receiving the audio is to receive audio from the microphone in response to detection of a key phrase at a wake-on-voice engine.

Example 48 includes the system of any one of examples 41 to 47, including or excluding optional features. In this example, the means for semantically generating the result set includes a neural network that is trained directly on audio using received training data including commands for different speech-controlled devices.

Example 49 includes the system of any one of examples 41 to 48, including or excluding optional features. In this example, the means for receiving the audio is to cause the display of a prompt including privacy options and receive user feedback including a consent to enable use of a cloud SLU engine. The selected SLU engine includes the cloud SLU engine.

Example 50 includes the system of any one of examples 41 to 49, including or excluding optional features. In this example, the means for receiving the audio is to continuously receive audio from the microphone in response to receiving the user feedback including the consent.

Not all components, features, structures, characteristics, etc. described and illustrated herein need be included in a particular aspect or aspects. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some aspects have been described in reference to particular implementations, other implementations are possible according to some aspects. Additionally, the arrangement and/or order of circuit elements or other features illustrated in the drawings and/or described herein need not be arranged in the particular way illustrated and described. Many other arrangements are possible according to some aspects.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more aspects. For instance, all optional features of the computing device described above may also be implemented with respect to either of the methods or the computer-readable medium described herein. Furthermore, although flow diagrams and/or state diagrams may have been used herein to describe aspects, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. An apparatus for routing audio streams, comprising:
an audio receiver to receive audio from a microphone;
a classifier to semantically generate a result set comprising a confidence score generated for each of a plurality of different spoken language understanding (SLU) engines based on the audio, wherein the classifier is trained directly on domain data associated with the plurality of different SLU engines associated with different devices;
a scheduler to select an SLU engine of the plurality of different SLU engines based on a highest confidence score in the result set; and
a router to stream the audio to the selected SLU engine.

2. The apparatus of claim 1, wherein the SLU engine is one of a plurality of SLU engines, each SLU engine associated with a different smart appliance.

3. The apparatus of claim 1, wherein the selected SLU engine is to receive the streamed audio, generate an action based on the streamed audio, and send the action to a smart appliance associated with the selected SLU engine.

4. The apparatus of claim 1, wherein the result set comprises a set of confidence scores calculated for a list of a plurality of SLU engines based on a chunk of the audio.

5. The apparatus of claim 1, wherein the scheduler is to further receive feedback from an application associated with the selected SLU engine and route the audio to a second SLU engine in response to receiving the feedback from the application.

6. The apparatus of claim 1, comprising a chunk generator to generate a plurality of chunks based on the received audio, wherein the classifier is to generate a result set for each of the plurality of chunks, the scheduler is to select an SLU engine for each of the plurality of chunks based on the result set associated with each of the chunks, and the router is to stream each of the chunks to the selected SLU engine for each of the chunks.

7. The apparatus of claim 1, wherein the audio receiver is to receive audio from the microphone in response to detection of a key phrase at a wake-on-voice engine.

8. The apparatus of claim 1, wherein the classifier comprises a neural network that is trained directly on audio using received training data comprising commands for different speech-controlled devices.

9. The apparatus of claim 1, wherein the audio receiver is to cause a display of a prompt comprising privacy options and receive user feedback comprising a consent to enable use of a cloud SLU engine, wherein the selected SLU engine comprises the cloud SLU engine.

10. The apparatus of claim 9, wherein the audio receiver is to continuously receive audio from the microphone in response to receiving the user feedback comprising the consent.

11. A method for routing audio streams, comprising:
receiving, via a processor, audio from a microphone;
semantically generating, via the processor, a result set comprising a confidence score generated for each of a plurality of different spoken language understanding (SLU) engines based on the audio via a classifier trained directly on domain data associated with the plurality of different SLU engines associated with different devices;
selecting, via the processor, an SLU engine of the plurality of different SLU engines based on a highest confidence score in the result set; and
streaming, via the processor, the audio to the selected SLU engine.

12. The method of claim 11, wherein semantically generating the result set comprises processing the audio using a neural network that is trained directly on audio using received training data comprising commands for different speech-controlled devices.

13. The method of claim 11, comprising generating, at the selected SLU engine, an action based on the streamed audio, and sending the action to a smart appliance associated with the selected SLU engine.

14. The method of claim 11, comprising modifying, via the processor, the classifier at runtime based on a user input.

15. The method of claim 11, comprising receiving, via the processor, feedback from an application of a device associated with the selected SLU engine, and routing the audio to a second SLU engine in response to receiving the feedback from the application.

16. The method of claim 11, comprising generating, via the processor, a plurality of chunks based on the received audio, wherein generating the result set comprises generating a result set for each of the plurality of chunks, wherein selecting the SLU engine comprises selecting the SLU engine for a chunk of the plurality of chunks based on the result set associated with the chunk, and wherein routing the audio comprises routing the chunk to the selected SLU engine.

17. The method of claim 11, comprising receiving, via the processor, audio from the microphone in response to detection of a key phrase at a wake-on-voice engine.

18. The method of claim 11, comprising training, via the processor, the classifier based on user responses to prompts to detect a preference for sending the audio to a local SLU engine or a cloud-based SLU engine.

19. The method of claim 11, comprising displaying a prompt comprising privacy options, and receiving user feedback comprising a consent to send the audio to a cloud SLU engine.

20. The method of claim 19, comprising continuously receiving, via the processor, audio from the microphone in response to receiving the user feedback comprising the consent.

21. At least one non-transitory computer readable medium for routing audio streams having instructions stored therein that, in response to being executed on a computing device, cause the computing device to:
receive audio from a microphone;
semantically generate, via a classifier trained directly on domain data associated with a plurality of different spoken language understanding (SLU) engines associated with different devices, a result set comprising a confidence score generated for each of the plurality of different SLU engines based on the audio;
select an SLU engine of the plurality of different SLU engines based on a highest confidence score in the result set; and
stream the audio to the selected SLU engine.

22. The at least one non-transitory computer readable medium of claim 21, comprising instructions to process the audio using a neural network that is trained directly on audio using received training data comprising commands for different speech-controlled devices.

23. The at least one non-transitory computer readable medium of claim 21, comprising instructions to generate an action based on the streamed audio and send the action to a smart appliance associated with the selected SLU engine.

24. The at least one non-transitory computer readable medium of claim 21, comprising instructions to modify the classifier at runtime based on a user input.

25. The at least one non-transitory computer readable medium of claim 21, comprising instructions to receive feedback from an application of a device associated with the selected SLU engine and route the audio to a second SLU engine in response to receiving the feedback from application.

* * * * *